United States Patent [19]

Bezner et al.

[11] Patent Number: 5,736,181
[45] Date of Patent: Apr. 7, 1998

[54] PROCESS FOR THE PRODUCTION OF EGG ROYALE

[75] Inventors: Klaus Bezner, Untergruppenbach-Unterheinriet; Florian Biller, Untergruppenback-Unterheinriet; Horst Klukowski, Neuenstadt-Kochertuern, all of Germany

[73] Assignee: CPC International Inc., Englewood Cliffs, N.J.

[21] Appl. No.: 686,884

[22] Filed: Jul. 26, 1996

[51] Int. Cl.$^6$ ............... A23C 9/00; A23C 19/00; A21D 13/00; A23B 4/03

[52] U.S. Cl. ............... 426/285; 426/272; 426/274; 426/275; 426/453; 426/518

[58] Field of Search ............... 426/285, 272, 426/274, 275, 453, 518

[56] References Cited

U.S. PATENT DOCUMENTS 4,537,788  8/1985  Proctor et al. ............... 426/614

FOREIGN PATENT DOCUMENTS

| | | | |
|---|---|---|---|
| 0485642 | 5/1992 | European Pat. Off. | A47J 29/00 |
| 469176 | 5/1995 | European Pat. Off. | |
| 4213232 | of 1993 | Germany | |
| 1274905 | 5/1972 | United Kingdom | |

OTHER PUBLICATIONS

European Search Report No. EP 96 11 3870, Dated May 14, 1997.

Patent Abstracts of Japan No. 62171655, Dated Jul. 28, 1987.

*Primary Examiner*—Marian C. Knode
*Assistant Examiner*—Ali R. Salimi
*Attorney, Agent, or Firm*—Ellen Plotkin

[57] ABSTRACT

Egg royale and process for the production of egg royale by coagulation of a mass containing whole egg, characterized in that a premix containing more than 10% by weight moisture is produced from milk powder, whole egg, raising agent, and seasonings. The premix is agglomerated and is applied in thin sheeting compressed by a roller to a steam belt on which the mass layer is treated with superheated steam for a time sufficient for coagulation of the egg white to take place. The resulting egg royale mass is diced and the dice are then dried.

11 Claims, No Drawings

PROCESS FOR THE PRODUCTION OF EGG ROYALE

FIELD OF THE INVENTION

The invention relates to a process for the industrial production of egg royale and to a marketable egg royale which can be produced by this process.

BACKGROUND OF THE INVENTION

The egg royale known from cuisine is a soup garnish made of whisked, seasoned egg mass which has been made to set in a water-bath. In hot stock, the egg royale is intended to retain its generally diced shape and not to disintegrate or fall apart immediately.

EP-B-469 176 discloses a process for producing a dewatered coagulated product in which the starting material is dewatered to a dry matter content of more than 90% under conditions which are suitable to give this material a porous structure, whereupon the dewatered material is coagulated by treatment with moist air, retaining the initial porosity. The starting product can comprise an egg base which is coagulated by this process. On the one hand, dewatering such a starting material without coagulation is difficult and, on the other hand, coagulation of a starting material having a dry matter content of more than 90% does not result in a satisfactory egg royale.

GB-B-1 274 905 discloses a process for producing an instantly soluble and/or instantly dispersible agglomerate, a pulverulent mixture of fine particles being agglomerated at a temperature of below 100° C. with moistening. The powder mixture can also contain egg yolk. The agglomeration occurs here due to partial moistening together with mechanical binding of the powder particles, but no coagulation occurs. Such a process is unsuitable for the production of egg royale, since the egg royale in use is just not intended to fall apart immediately, but is intended to remain dimensionally stable for as king as possible in the hot stock in which it is used.

An object of the present invention is to provide a process for the industrial production of egg royale.

Another object of the present invention is to provide an egg royale produced by the process of the present invention.

A further object of the present invention is to provide an egg royale which retains its generally diced shape and does not disintegrate or fall apart immediately in the hot stock in which it is used.

SUMMARY OF THE INVENTION

Accordingly, the present invention provides a process for the production of egg royale by coagulation of a mass containing whole egg, wherein a premix containing more than 10% by weight of moisture is produced from milk powder, whole egg, raising agent and seasonings. The premix is agglomerated and is applied in thin sheeting compressed by a roller to a steam belt on which the mass layer is treated with superheated steam for a time sufficient for coagulation of the egg white to take place. The superheated steam treatment is carried out on the steam belt at a temperature of 95°–105° C. for 6–12 minutes. The resulting egg royale mass is diced and the dice are then dried. A starch, such as a native wheat starch or tapioca starch, may be added to the premix. The egg constituent of the premix may be added in the form of dry egg white and liquid egg yolk. Seasonings and/or aroma substances may be added to the premix.

The present invention also provides an egg royale containing 5–7% by weight of coagulated egg white, 22–28% by weight of egg yolk, 44–48% by weight of milk powder, 12–15% by weight of starch, 1–3% by weight of reacted raising agent, 1–3% by weight of salt and 3–6% by weight of residual moisture and further containing seasonings and/or aroma substances.

DETAILED DESCRIPTION

The process according to the invention for the production of egg royale by coagulation of a mass containing whole egg is characterized in that a premix containing more than 10% by weight of moisture is produced from milk powder, whole egg, raising agent, and seasonings, this is agglomerated and is applied in thin sheeting compressed by a roller to a steam belt on which the mass layer is treated with superheated steam for a time sufficient for coagulation of the egg white to take place, the resulting egg royale mass is diced and the dice are then dried.

To improve the consistency of the egg royale, a starch is preferably added to the premix. Native cereal starches like rice, corn and wheat starch, or tuber starches like potato starch or tapioca starch are suitable. Preference is given to native wheat starch and tapioca starch.

Expediently, the egg constituent is added to the premix in the form of two separate components, namely the egg white in the form of dry egg white and the yolk in the form of natural liquid egg yolk.

The milk powder can be whole milk powder.

Raising agents which are suitable are all substances or mixtures which are able to release gas by a chemical reaction under the influence of moisture and/or heat. The mass is raised by the gas forming in small bubbles. The raising agents known to those skilled in the art comprise in particular a mixture of sodium hydrogen carbonate and an acidulant which can be, for example, tartaric acid. In principle all edible organic acids are suitable, for example also glucono-delta-lactone, as well as acid sodium salts or potassium salts of phosphoric acids. A raising agent particularly suitable for the purpose according to the invention is a mixture of tartaric acid and sodium bicarbonate.

Common salt is preferably added as seasoning. However, other seasonings and/or aroma substances can be further added, for example, glutamate and flavouring constituents such as in particular herbs and other aroma substances.

A suitable premix contains 25–50% by weight, preferably 35–45% by weight, of milk powder, preferably whole milk powder; 2–8% by weight; preferably 4–5.5% by weight, of dry egg white; 20–50% by weight, preferably 35–45% by weight, of egg yolk, preferably hen's egg yolk in natural liquid form; 3–25% by weight of starch, preferably 8–14% by weight of native cereal starch; 0.5–2.5% by weight, preferably 1–2% by weight, of raising agent; and 0.5–3% by weight, preferably 0.8–2% by weight, of salt.

The constituents are premixed without predrying with their normal moisture content, the liquid egg yolk expediently being added as the last component. Addition of the liquid egg yolk, which is preferably carried out in a cutter, causes wet agglomeration to occur.

The loose agglomerate, before it liquefies to form a dough and the raising agent begins to act, is then applied as rapidly as possible to a transport belt in a thin uniform sheeting. After application, the loose agglomerate can be pressed down by a dough roller to form a uniform layer. Immediately thereafter, the transport belt is introduced into a steam tunnel where it is impinged by superheated steam from above and also expediently from beneath. The dough strip shaped by the dough roller is exposed during this to temperatures of 95°–105° C. and is expanded owing to the action of the raising agent. Because of the high temperature, in addition, the egg white coagulates, so that at the end of the steam belt, after about 6 to 12 minutes, a light expanded egg royale mass is obtained which is immediately longitudinally cut and cross-cut, expediently, by circular knives and vertical cutters, to form dice, which are then dried in a suitable manner, on a belt or in trays, expediently to a residual moisture of 2–12% by weight, preferably 3–6% by weight.

The egg royale dice thus obtained can be packaged without abrasion and have good keeping quality and reconstitute in a hot stock to form a light, but dimensionally stable and not instantly dispersible egg royale having the quality of a product prepared by cooks.

The premix used is preferably set in such a way that an egg royale according to the invention is formed which contains 5–7% by weight of coagulated egg white, 22–28% by weight of egg yolk, 44–48% by weight of milk powder, 12–15% by weight of starch, 1–3% by weight of reacted raising agent, 1–3% by weight of salt and 3–6% by weight of residual moisture.

The following are examples of the present invention, and are not meant to be limiting in any way.

EXAMPLE 1

10.5 kg of whole milk powder, 1.3 kg of dry egg white, 3.1 kg of native wheat starch, 0.4 kg of a raising agent, essentially comprising tartaric acid and bicarbonate; and 0.4 kg of common salt were premixed dry. To this dry premix were added 9.5 kg of liquid egg yolk in a cutter. The cutter was operated for a short time up until complete mixing of the constituents and the mixture still in agglomerate form was applied in a thin layer to a running transport belt and was pressed down into a thin layer by a dough roller. Immediately downstream of the dough roller, the transport belt was run into a steam tunnel and there impinged with saturated steam having a temperature of 100°–105° C. When the expanded and coagulated product was removed from the steam tunnel after about 7 minutes, a temperature of 85° C. was measured in the product.

The expanded product on the transport belt was longitudinally cut and cross-cut by a circular knife roller and a vertical cutter to form small dice which were dried with air on trays in a drying cabinet in the course of about one hour to a residual moisture of 4%.

EXAMPLES 2A–2D

The following batches were processed:

| | | |
|---|---|---:|
| A | Whole egg powder: | 27.1% |
| | Whole milk powder: | 40.5% |
| | Wheat Starch: | 10.8% |
| | Raising agent (sodium hydrogen carbonate and disodium dihydrogen pyrophosphate): | 1.8% |
| | Salt/seasoning: | 1.8% |
| | Water: | 18.0% |
| | | 100% |
| B | Hen's egg white powder: | 5.0% |
| | Whole milk powder: | 40.3% |
| | Rice Starch: | 12.2% |
| | Raising agent (sodium hydrogen carbonate and disodium dihydrogen pyrophosphate: | 2.0% |

-continued

| | | |
|---|---|---:|
| | Salt/seasoning: | 2.0% |
| | Liquid hen's egg yolk (pasteurized) | 38.5% |
| | | 100% |
| C | Whole milk powder: | 39.2% |
| | Potato Starch: | 10.2% |
| | Hen's egg white: | 7.0% |
| | Raising agent (sodium bicarbonate and sodium dihydrogen phosphate): | 2.0% |
| | Common salt + seasoning: | 2.0% |
| | Chive rings, dried: | 1.4% |
| | Parsley leaves, dried: | 0.2% |
| | Hen's egg yolk, liquid: | 38.0% |
| | | 100% |
| D | Whole milk powder: | 37.1% |
| | Tapioca starch: | 10.2% |
| | Hen's egg white: | 7.0% |
| | Raising agent (sodium bicarbonate and disodium hydrogen phosphate): | 2.0% |
| | Common salt + seasoning: | 2.0% |
| | Sweet pepper puree 20° Brix: | 8.7% |
| | Hen's egg yolk, liquid: | 33.0% |
| | | 100% |

The dry components were premixed, producing a dry premix. The dry premix was processed in a cutter with the wet constituents to form a (still flowable) agglomerate which was sheeted on a conveyor belt.

The agglomerate was fed in a layer thickness of 25–30 mm to a compression roller and was compressed between conveyor belt (steam tunnel belt) and roller to 3 mm dough strip thickness to form a dough strip.

The dough strip passed through a steam tunnel at 100°–105° C. (with injections of saturated steam) in the course of 7–12 minutes.

During this operation, the dough strip expanded from 3 mm to 8–10 mm in height, the egg white components coagulated and became stabilized in the expanded state.

The invention now being fully described, it will be apparent to one of ordinary skill in the art that many changes and modifications can be made thereto without departing from the spirit or scope of the invention as set forth herein.

We claim:

1. A process for the production of egg royale by coagulation of a mass containing whole egg, said process comprising (1) producing a premix containing more than 10% by weight of moisture, said premix comprising milk powder, whole egg, raising agent and seasonings, (2) agglomerating and applying said premix in thin sheeting compressed by a roller to a steam belt on which the mass layer is treated with superheated steam for a time sufficient for coagulation of the egg white to take place, (3) dicing the resulting egg royale mass to form dice, and (4) drying said dice.

2. The process according to claim 1, wherein said premix further comprises starch.

3. The process according to claim 2, wherein said starch is chosen from the group consisting of native wheat starch and tapioca starch.

4. The process according to claim 1, wherein said whole egg comprises dry egg white and liquid egg yolk.

5. The process according to claim 4, wherein said premix comprises 25–50% by weight of milk powder, 2–8% by weight of dry egg white, 20–50% by weight of liquid egg yolk, 3–25% by weight of starch, 0.5–2.5% by weight of raising agent and 0.5–3% by weight of salt.

6. The process according to claim 4, wherein said premix comprises 35–45% by weight of whole milk powder, 4-5.5% by weight of dry egg white, 35-45% by weight of liquid egg yolk, 8-14% by weight of native cereal starch, 1-2% by weight of raising agent and 0.8-2% by weight of salt.

7. The process according to claim 4, wherein said premix has a composition such that the egg royale, after drying to a residual moisture of 3-6% by weight, comprises 44-48% by weight of milk powder, 5-7% by weight of egg white, 22-28% by weight of egg yolk, 12-15% by weight of starch, 1-3% by weight of raising agent and 1-3% by weight of salt.

8. The process according to claim 1, wherein said premix further comprises aroma substances.

9. The process according to claim 1, wherein said superheated steam treatment is carried out on a steam belt at a temperature of 95°-105° C. for 6-12 minutes.

10. Egg royale comprising 5-7% by weight of coagulated egg white, 22-28% by weight of egg yolk, 44-48% by weight of milk powder, 12-15% by weight of starch, 1-3% by weight of reacted raising agent, 1-3% by weight of salt and 3-6% by weight of residual moisture.

11. The egg royale according to claim 10, further comprising seasonings and/or aroma substances.

* * * * *